US006042857A

United States Patent [19]

Jones et al.

[11] Patent Number: 6,042,857

[45] **Date of Patent: *Mar. 28, 2000**

[54] COMBINATION CONTAINER AND DRY PET FOOD FOR INCREASED SHELF LIFE, FRESHNESS, PALATABILITY, AND NUTRITIONAL VALUE

[75] Inventors: David R. Jones, Palm Beach, Fla.; Lon D. Lewis, Topeka, Kans.

[73] Assignee: Seal Rock Technologies Incorporated, Palm Beach, Fla.

[ * ] Notice: This patent is subject to a terminal disclaimer.

[21] Appl. No.: 09/318,179

[22] Filed: May 25, 1999

Related U.S. Application Data

[63] Continuation of application No. 08/912,410, Aug. 18, 1997.

[51] Int. Cl.[7] .............................. B65D 85/00; A23K 1/00

[52] U.S. Cl. .......................... 426/106; 426/392; 426/418; 426/635; 383/103; 383/109; 428/34.3; 428/34.6; 428/36.7

[58] Field of Search .................................... 426/106, 335, 426/327, 635, 118, 392, 418; 383/109, 103; 428/34.3, 34.6, 36.7

[56] References Cited

U.S. PATENT DOCUMENTS

| | | | |
|---|---|---|---|
| 3,708,306 | 1/1973 | Appleman | 99/2 R |
| 3,985,904 | 10/1976 | Bernotavicz | 426/151 |
| 4,158,706 | 6/1979 | Ernst et al. | 426/327 |
| 4,273,788 | 6/1981 | Bone et al. | 426/805 |
| 4,284,652 | 8/1981 | Christensen | 426/72 |
| 4,444,796 | 4/1984 | Ueno et al. | 426/335 |
| 4,495,208 | 1/1985 | Friedman et al. | 426/335 |
| 5,443,851 | 8/1995 | Christie et al. | 426/88 |
| 5,500,303 | 3/1996 | Anderson | 428/475.5 |
| 5,584,409 | 12/1996 | Chemberlen | 220/89.1 |
| 5,643,625 | 7/1997 | Perry et al. | 426/395 |

OTHER PUBLICATIONS

Corbin, J., “Petfood rancidity”, Petfood Industry, Jan./Feb. 1996, p. 6.

“Ethoxyquin study results”, Petfood Industry, 38(3), May/Jun. 1996, pp. 52–53.

*Primary Examiner*—Nina Bhat
*Attorney, Agent, or Firm*—Zarley, McKee, Thomte, Voorhees & Sease

[57] ABSTRACT

The combination of a substantially gas impermeable container and a dry pet food of high soluble fiber content that has a water activity within the range of 0.5 to 0.8. The result is long lasting, highly nutritious dog food that can be substantially free of added preservatives, antimycotics, and other unnatural chemicals.

20 Claims, No Drawings

COMBINATION CONTAINER AND DRY PET FOOD FOR INCREASED SHELF LIFE, FRESHNESS, PALATABILITY, AND NUTRITIONAL VALUE

CROSS REFERENCE TO RELATED APPLICATION

This application is a Continuation of Ser. No. 08/912,410, filed on Aug. 18, 1997.

FIELD OF THE INVENTION

This invention relates generally to a package or container and dry pet food combination that does not require preservatives or removal of oxygen from the bag and particularly to the resulting increased shelf life, freshness, palatability, and nutritional value of the dry pet food in combination with the container.

BACKGROUND OF THE INVENTION

Companion pets, such as dogs and cats, are important family members and may live to be 15, 20 or even more years contributing to the well being and mental health of the family. These companion animals longevity will best be served through good nutrition, therefore, it is important to protect the nutritional content, digestibility, and palatability of the companion pet food.

Pet foods are now generally classified into three types by their water content, namely: dry pet foods which generally have a water content of less than about 15% by weight, more particularly within the range of approximately 6–12%; semi-moist pet foods which generally have a water content of 20–40% by weight; and pet foods which have a high water content of more than 45% by weight, more particularly in the range of about 65–85%.

Pet foods having a high water content are generally sold in canned form. These canned pet foods require retorting because the high content of water is suitable for growth of microorganisms. Moreover, after can opening, the canned food should be stored in a refrigerated state because they undergo spoilage very soon. Thus the pet foods of high water content in canned form require high cost for processing in canning, and are inconvenient to store. The dry pet foods and the semi-moist pet foods are easier to package and transport, and need not be refrigerated after they are opened. They are easy to give animals, and are convenient to pet keepers.

The products of semi-moist content are unstable unless they contain extensive additives, some of which may be harmful to the animal. Due to their higher level of moisture content, they are more susceptible to microorganism growth than dry pet foods. Microorganisms which may cause spoilage are living in the products of semi-moist content because their water content is not so low as to inhibit growth of microorganisms and the temperature for heat treatment of these products is not so high as to achieve complete sterilization. Even if the products are heat-sterilized completely, they are susceptible to secondary contamination because they are packed in a simplified form. The products of semi-moist content, therefore will spoil soon if no measure is taken. The most prevalent practice of preventing microbial growth is to add some form of preservatives and/or antimycotics.

The dry pet foods contain up to about 15% moisture by weight and are the simplest to handle and store and least expensive to ship. Hard, dry pet food, while being easy to store and handle, is not as palatable as the other classes of pet food for some animals. Thus, although dry pet food may be very nutritional, in some cases it is not a particularly acceptable pet food to either the pet or the pet owner. This lower palatability is due partly to the deterioration of the pet food or overdrying of the pet food in an effort to prevent deterioration.

Two major causes of deterioration in dry pet food are microbial growth and oxidation. Both of these deterioration factors cause decreased diet palatability and decreased nutritional value. In addition, microbial growth also increases the risk of food intolerance. Some microorganisms and the toxins they produce may cause vomiting, diarrhea, and even death of animals consuming them. Problems associated with pet food oxidation also include decreased immune function and therefore increased susceptibility to infectious diseases. Cardiovascular diseases, muscular dystrophy, or degeneration and steatitis, any of which may result in death, also occur as a result of the ingestion of oxidized or rancid food. Although oxidation of commercial pet food severe enough to cause these effects is uncommon, sufficient oxidation to result in decreased diet palatability and a dry lusterless hair coat is quite common.

Methods commonly used to minimize these effects is to dry the food sufficiently to prevent microbial growth and to add preservatives to the food. Too much drying of the food however makes it hard and crumbly reducing the foods palatability to pets. Further, the heat used to dry the food increases oxidation and, if the heat is sufficient, it also decreases the diet's digestibility. Preservatives used are primarily anti-oxidants, although substances such as sugars and propylene glycol have been added to bind water making it unavailable either for microbial growth or oxidation. The major anti-oxidants used are mixed tocopherols, various acids, and synthetic chemicals such as BHA, BHT, and most commonly ethoxyquin. Ethoxyquin, which is used as an antioxidant in rubber products, is well recognized as one of the most efficient antioxidants available. Although it is allowed in pet foods, it is not allowed in foods intended for people and many question its safety for pets. A 3.5 years, two consecutive generations, study of beagle dogs showed that liver pigmentation changes and elevated liver enzymes were found in dose-dependent levels following ingestion of ethoxyquin. *Pet Food Industry,* 38(3):51–53, (May/June 1996). While the study concluded that the liver pigmentation was not considered critically significant and the dog's overall health did not appear to be affected, an alternative to such additives would be preferred. Whether true or not, many pet owners believe that these chemicals, particularly ethoxyquin, are harmful to their pets.

In addition to the problems associated with anti-oxidants, the large amount of sugar and/or sugar alcohols sometimes added, reaching as large as 20–35% by weight, is too high for usual feeds of animals and is detrimental to nutritional balance. Moreover, a high sugar content causes poor digestion in certain animals, especially old animals. Further, propylene glycol used as an antiseptic could have potentially adverse affects on the health of an animal after long term feeding of pet foods containing large amounts of propylene glycol. Accordingly, none of these measures are entirely satisfactory because of the problems of nutritional balance, the health of the animals, and palatability. Further, attempts to solve these problems have heretofore resulted in wide variations in the storagability of pet foods.

Regardless of the procedures taken to prevent dry pet food deterioration, those currently used are inadequate. In a recent study, Dr. Jim Corbin, University of Illinois, reported that "of 37 various commercial pet foods from store shelves, 43% had peroxide values in excess of 20 meq/kg of fat". *Pet Food Industry,* 38(1)6, (January–February 1996). Animal fat rancidity odor is easily detected by, and food palatability decreased for people at peroxidated values of 20 meq/kg or greater. Since a dog's sense of smell is 50–100 times more sensitive the people's, a much lower value is undoubtedly detected by them, decreasing the diet's palatability. This degree of oxidation also decreases the nutritional value of required essential or unsaturated fatty acids, which if sufficiently severe results in their deficiency affects. This is first indicated by a dry lusterless hair coat, a common problem in dogs receiving dry commercial dog food.

To prevent these effects, vacuum packaging in gas impermeable bags has recently been used. Although this method quite likely is effective, no results currently have been published or made available. In addition, vacuum packaging of pet foods has several major disadvantages include: costly equipment, a rate of production too slow for most manufacturing plants, and a rough poorly readable package unacceptable to many retailers and pet owners. Of three companies that have so far tried vacuum packaging, one has stopped using it and the other two have gone out of business.

Two things, water and oxygen, are necessary for microbial growth in and oxidation of a food. The present invention inhibits microbial growth and oxidation of pet food through minimizing both the water and oxygen available for food spoilage to occur. This decrease in available water and oxygen is accomplished without the use of chemical preservatives or vacuum packaging, thus eliminating the problems associated with them as mentioned above.

In addition, the present invention will provide numerous health benefits over prior art container and dry pet food combinations. In addition, the present invention provides maintained freshness and palatability as well as nutritional value of the pet food. Finally, the present invention permits prolonged shelf life and decreased production, storage and transportation costs.

SUMMARY OF THE INVENTION

It is an object of the invention to provide a combination container and dry pet food that inhibits microbial growth and oxidation without the use of vacuum packaging or addition of chemical preservatives.

Another objective of the invention is to provide a combination container and dry pet food with maintained freshness, improved palatability, and maintained nutritional value.

It is a further object of the invention to provide a combination container and dry pet food with prolonged shelf life.

Yet another objective of the invention is to provide a combination container and dry pet food that results in decreased production, storage, and transportation costs.

Additional objectives and advantages of the invention will be set forth in part in the description that follows, and in part will be obvious from the description, or may be learned by the practice of the invention. The objects and advantages of the invention will be obtained by means of the instrumentalities and combinations particularly pointed out in the appended claims. To achieve the objects and in accordance with the purpose of the invention, as embodied and broadly described herein, the present invention provides a combination container and dry pet food with increased shelf life, freshness, palatability, and nutritional value.

Ingredients high in soluble fibers such as oats, flax seed meal and psyllium, were selected and used to produce a diet high in soluble fiber. This is the preferred natural dog food for this invention. These fiber ingredients were used instead of the corn, wheat or animal ingredients which are commonly used in the pet food industry but contain little soluble fiber. Soluble fiber confers many health benefits including: assisting in the normalization of intestinal transit; prevention of diarrhea, constipation, or excessive hard stools; a decrease in blood cholesterol, therefore, preventing cardiovascular disease; binding of pathogens in the intestinal track, therefore reducing their effect; and a decrease in post prandial hyperglycemia. In addition to these numerous health benefits, soluble fiber also binds 30–70 times their weight of water rendering the water unavailable from microbial growth and for oxidation. The amount of edible soluble fiber material present in the pet food is preferably above 3% by weight and most preferably within the range of 5% to 15% by weight.

In another embodiment, the invention comprises a combination container and dry pet food wherein the container is gas impermeable, therefore further minimizing oxidation without the need for removing oxygen from the bag either by vacuum, nitrogen fill or oxygen scavengers.

Yet another embodiment of the invention comprises a combination container and dry pet food that results in prolonged shelf life due to the minimized oxidation and reduced bacterial growth and decreased production storage and transportation costs. These reductions in cost are due to the ability to produce a greater quantity of pet food in a single run, no additional cost necessary to nitrogen fill or provide oxygen scavengers in the container to remove oxygen, and no special temperature or humidity requirements. This longer shelf life further results in the ability for a shopkeeper to order more pet food per order thereby decreasing the cost of shipping per unit.

The method and package used to achieve these objectives as well as others will become apparent from the following detailed description of the invention.

DETAILED DESCRIPTION OF THE INVENTION

Reference will now be made in detail to the presently referred embodiments of the invention, which together with the following examples, serve to explain the principles of the invention and the synergy of the combination.

The invention relates to a combination container and dry pet food. It provides a means for storing dry pet food with maintained freshness, palatability, and nutritional value, as well as prolonged shelf life. In addition, the invention relates to a combination container and dry pet food that allows for decreased production, storage, and transportation costs.

In an effort to provide to the pet food industry a pet food that is both palatable and easy to store, and with a reasonable shelf life, the pet food industry has focused much effort in the area of preserving the different moisture classes of pet food. See for example, Friedman et al., U.S. Pat. No. 4,495,208 issued Jan. 22, 1985; Ueno et al., U.S. Pat. No. 4,444,796 issued Apr. 24, 1984; Bone et al., U.S. Pat. No. 4,273,788 issued Jun. 16, 1981; Ernst et al., U.S. Pat. No. 4,158,706 issued Jun. 19, 1979; and Bernotavicz, U.S. Pat. No. 3,985,904 issued Oct. 12, 1976, all of which are incorporated herein by reference. Broadly speaking, these prior art pet food compositions used a combination of high heat treatment and the addition of preservatives and/or antimycotics. In addition, these products frequently have included a high level of sugars, edible organic acids and inorganic acids to maintain pH. Finally, the packaging of these pet food products includes reduction of available oxygen through vacuum packaging, nitrogen fill, or oxygen scavengers. Thus the package is costly as is the process and food quality, especially its natural state, is sacrificed with preservatives, flavor masks, etc.

In the present invention, the water and oxygen necessary for microbial growth in and oxidation of food are minimized through the use of soluble fiber and a container constructed of gas impermeable materials.

One way to reduce the water available for microbial growth and for oxidation is to bind the water. In the present invention, soluble fiber is used which binds water in the range of about 30–70 times the weight of the soluble fiber. The amount of water available, or unbound, is indicated by a food or substance's water activity. As shown in Table 1 a water activity of 0.64 or less insures the absence of microbial growth and at 0.4 to 0.5 oxidation rate is the slowest. In the present invention, this water activity is kept at a range of about 0.5 to about 0.8 and preferably 0.7 or below, and a percent moisture by weight of pet food at about 6% to 10%.

TABLE 1

Water Activity (W.A.) and its Effects

| W.A. | Effects |
|---|---|
| 1.0 | 100% of water is unbound or available |
| 0.90 | 90% of water is unbound or available |
| <0.90 | most microorganisms can't grow because of inadequate water available |
| 0.80 | oxidation rate is 120% above minimum |
| 0.70 | oxidation rate is 70% above minimum |
| 0.64 | lowest W.A. at which any organisms can grow and therefore below which is optimum to ensure their absence |
| 0.60 | oxidation rate is 25% above minimum |
| 0.40–0.50 | oxidation rate is slowest |
| 0.30 | oxidation rate is 16% above minimum |
| 0.20 | oxidation rate is 45% above minimum |
| 0.10 | oxidation rate is 110% above minimum |

In one embodiment of the present invention, the pet food is comprised of ingredients consisting of flax seed meal, lentils, oat groates, peas, sunflower seed oil, canola seed meal, rice, dehydrated cane juice, yeast, sea kelp, calcium carbonate, salt, psyllium and spirulina (listed in order of decreasing amount in the diet). The dry pet food also contains 20% crude protein, 15% crude fat, 8% moisture, 5% crude fiber and 5% ash. This results in a pet food that is several times higher than most pet foods in unsaturated fatty acids which are susceptible to oxidation and in soluble fiber to bind water to reduce microbial activity and oxidation.

In the present invention, the gas impermeable container in which the dry pet food is stored, minimizes the available oxygen without resorting to vacuum packaging or oxygen scavengers. There are several oxygen barrier materials available that can be used in the creation of a gas impermeable container. See for example, Anderson, U.S. Pat. No. 5,500,303 issued Mar. 19, 1996, incorporated herein by reference. A surprising result was that neither use of preservatives nor removing oxygen from the bag either by vacuum, nitrogen flush or oxygen scavengers is necessary when the food composition described is sealed in a gas impermeable bag as described. Virtually no oxidation occurs during storage, thus, with this invention shelf life of pet food can be prolonged and freshness, palatability, and nutritional value maintained.

A film barrier package according to one embodiment of the invention has an inner ply of a polymeric material, an outer ply of a polymeric material, and a substantially air free space disposed therebetween. Each of the two plies is formed of a sheet of polymeric material; these two plies may be formed of the same or different polymers. Their individual oxygen transmission rates should be approximately equal.

In some applications, the two plies may be formed by simply folding a single sheet of polymeric material to provide two plies adjacent one another and joined together along one edge thereof. In such a design, the inner and outer plies of the barrier may be sealed together, such as by heat sealing or the like, to fully define the anaerobic space therebetween—the space should not be open to the atmosphere.

The plies may be formed of any known polymer having sufficient barrier properties for use in packaging applications. Films currently used in the art include those made from polyester, polypropylene, PVDC, nylon, and polyethylene, as well as multi-layer laminate films formed of contiguous, bonded layers of these and other polymers. Any of these films may be advantageously used in the present invention. One of the goals of the invention, though, is to provide a particularly cost effective oxygen barrier for use in packaging applications. In order to further that end, in many situations it will be advantageous to use a cheaper polymeric film.

The thickness of these two plies of polymeric material may be varied as desired. It is contemplated that the thickness of each of these plies will be dependent on the particular application for which the barrier package of the invention is being used. This thickness may also depend upon the composition of the plies because, as explained above, the oxygen transmittance of a polymeric film will depend to a very large extent upon the material from which it is formed.

The present invention results not only in improved pet health and food acceptance, but in decreased production, storage, and transportation costs. Due to the high soluble fiber content and lower moisture level a greater quantity of pet food can be created per production run resulting in lower production costs. In addition, since the pet food can be placed directly into the container without the need for nitrogen flush, oxygen scavengers or vacuum sealing the production costs are also reduced. Storage and transportation costs are also reduced because there are no special temperature or humidity requirements. Transportation costs are also reduced because the containers of pet food have a longer shelf life which means larger quantities can be purchased per shipment thus reducing the shipping price per pound.

The combination of pet foods of the present invention free of adulterating preservatives, anti-oxidants, anti-mycotics, flavor agents and masking agents and moisturizer additives, and the barrier package produce a synergistic result never achieved before in the pet food industry. No all-natural, storable dog food has ever been developed that was as animal healthful without having to use canned storage or expensive oxygen free vacuum or inert gas packaging. As a result of this invention natural, healthy choice dog foods can be made which have long shelf life and avoid expensive, time-consuming packaging, heretofore used. As a result, unnatural, perhaps non-healthy food modifications previously used to escape package deficiencies can now be avoided.

It is to be understood that the application of the teachings of the present invention to a specific problem or environment will be within the capabilities of one having ordinary skill in the art in light of the teachings contained herein. The examples of the products and processes of the present invention appear in the following examples which are to be taken as illustrative but not limiting.

EXAMPLE 1

Water Activity and Oxidation Study

A study was conducted to determine the optimum amount of natural preservative, if any, the optimum type of packaging material, and the optimum atmosphere within the container to insure maintained freshness, nutritional value, palatability and shelf life.

To prevent microbial growth and oxidation without the use of chemical preservatives, the following natural preservatives were put into the diet and evaluated:

(1) no preservatives (none);

(2) 0.5% (500 ppm) Naturox (Kemin Industries, Des Moines) which consists of mixed tocopherols, rosemary extract, citric acid and mono- and di-glycerides (N);

(3) 1% lauracedin, 5% lactic acid and 0.5% Naturox (1LLN); and (4) 3% lauracedin, 5% lactic acid and 0.5% Naturox (3LLN). Lauracedin is a fatty acid shown to prevent microbial growth and whose activity is enhanced by the presence of lactic acid.

Four different types of packaging were considered in this study including two paper bags (AP and UC) that are routinely used in the pet food industry. The four bags consist of:

1. A 6 mil paper, 1 mil polyethylene bag, freely gas permeable (AP bag);

2. A 6 mil paper, 2 mil polyethylene bag, freely gas permeable (UC bag);

3. A moderately gas impermeable 48 gauge PET barrier bag with an oxygen transmission rate of 0.586 cc/100 sq inches/24 hours/atm (L bag); and 4. A gas impermeable foil bag with an oxygen transmission rate of less than 0.01 cc/l00 square inches/24 hours/atm and with a one way valve that lets air out but not in (K bag).

The atmosphere in each of the bags was further modified by doing one of the following:

1. Nothing (Neither);

2. Nitrogen flush to reduce oxygen to below 2% before sealing the bag (N Flush);

3. Oxygen scavenger packet put into the bag before sealing it (O Scav); or

4. Both nitrogen flush and oxygen scavenger before sealing the bag (Both).

The food tested in the study was an organic ingredient containing adult dog diet consisting of flax seed meal, lentils, oat groates, peas, sunflower seed oil, canola seed meal, rice, dehydrated cane juice, yeast, sea kelp, calcium carbonate, salt, psyllium, and spirulina (listed in order of decreasing amount in the diet). It contained 20% crude protein, 15% crude fat, 8% moisture, 5% crude fiber and 5% ash.

Two samples of each of the preceding combination of factors (preservatives, packaging and atmosphere), which consisted of 112 samples, were used in the study. Each sample was evaluated for the amount of oxidation present by thiobarbituric acid (TBA) analysis one week after it was produced and packaged and again 4 months later. During this 4-month period the samples were stored at 37° C. and 85% relative humidity to induce the amount of oxidation that would occur during 12 months storage at room temperature and ambient humidity. The TBA analysis measures the concentration of malonaldehyde produced as a result of oxidation. Its concentration correlates best with the oxidation induced decrease in diet palatability, which is the first effect of food oxidation. Because of this, it is considered to be the best indication of shelf life stability. Following one year storage effects accelerated to 4 months, water activity was also measured as an indication of the diets susceptibility to microbial growth.

As shown in Tables 2, 3 and 4 the diet studied contained sufficient soluble fiber and other constituents to bind adequate water so that regardless of the preservatives, atmosphere or bags used, its water activity was sufficiently low to prevent microbial growth (<0.64) and was near that at which oxidation is minimized (0.4–0.5).

TABLE 2

Preservatives Effect on Water Activity on Pet Food From Gas Impermeable Bags Without An Altered Atmosphere

| Preservatives | 3LLN | 1LLN | N | None |
|---|---|---|---|---|
| Water Activity | 0.57 | 0.57 | 0.56 | 0.57 |

TABLE 3

Atmosphere Effect on Water Activity of Pet Food Containing Naturox From Gas Impermeable Bags

| Preservatives | N Flush | O Scav | Both | Neither |
|---|---|---|---|---|
| Water Activity | 0.51 | 0.60 | 0.58 | 0.56 |

TABLE 4

Bag Effect on Water Activity of Pet Food Containing Naturox With Nitrogen Flush and Oxygen Scavenger

| Bag: | UC | AP | L | K |
|---|---|---|---|---|
| O Perm. cc/si/d | Freely | Freely | 0.00585 | <0.0001 |
| Water Activity | 0.66 | 0.58 | 0.65 | 0.56 |

As shown in Table 5 the amount of oxidation occurring in the food was directly related to the oxygen or gas permeability of the bag containing it. During the 12 month simulated study, the food in the freely permeable paper bags became highly oxidized, whereas no significant oxidation occurred in most gas impermeable bags.

TABLE 5

Bag Effect on Oxidation of Pet Foods as Indicated by Malonaldehyde (mg/kg) Formed in 4 months at 37° C. & 85% RH

| Bag: | UC | PF | L | K |
|---|---|---|---|---|
| O Perm. cc/si/d | Freely | Freely | 0.00586 | <0.0001 |
| M. aldehyde-mg/kg | 6.1 | 5.3 | 0.6 | 0.1 |

As shown in Tables 6 and 7, none of the preservatives or altered atmospheres decreased oxidation. In gas permeable bags (UC & AP) oxidation was high whereas no oxidation occurred in food in the gas impermeable bags (K), whether it contained a preservative or not (Table 6). Altering the atmosphere in gas impermeable bags (K) isn't needed as no oxidation occurs regardless of the atmosphere. However, in moderately gas impermeable bags (L) when neither oxygen scavengers or nitrogen flush were used some oxidation occurred, which was prevented when either, or both, were used. (Table 7).

TABLE 6

Preservative Effect on Oxidation of Pet Food as Indicated by Malonaldehyde (mg/kg) Formed in 4 months at 37° C. and 85% RH

| Bag | O Perm-cc/si/d | Naturox only | Lauracedin & Lactate | No Pre-servatives |
|---|---|---|---|---|
| UC | Freely | 8.1 | 7.09 | 3.9 |
| AP | Freely | 6.5 | 5.8 | 4.2 |
| L | 0.00586 | 1.7 | 1.0 | 1.0 |
| K | <0.0001 | −0.1 | −0.1 | 0.0 |

TABLE 7

Atmosphere Effect on Oxidation of Pet Food as Indicated by Malonaldehyde (mg/kg) Formed in 4 months at 37° C. and 85% RH

| Bag | O Perm-cc/si/d | Oxygen Scav. | Nitrogen Flush | Both | Neither |
|---|---|---|---|---|---|
| UC | Freely | 6.0 | 6.2 | 6.3 | 6.0 |
| AP | Freely | 5.3 | 5.7 | 5.3 | 5.0 |
| L | 0.00586 | 0.6 | 0.8 | −0.2 | 1.3 |
| K | <0.0001 | −0.1 | −0.1 | −0.2 | 0.2 |

As shown in Table 8, there is inadequate unbound water in the pet food studied to allow any microbial growth to occur, and little or no oxidation occurred even without the use of preservatives, nitrogen flush, oxygen scavengers or vacuum packaging when the food was packaged in gas impermeable bags. Oxidation during the 12 month accelerated study was 2-times higher in moderately gas impermeable bags and 24 to 27-times higher in the freely gas permeable bags currently in common use in the pet food industry.

TABLE 8

Stability of Pet Food High in Soluble Fiber Without Preservatives, Nitrogen Flush, Oxygen Scavengers or Vacuum Packaging

| Bag | UC | AP | L | K | Optimum |
|---|---|---|---|---|---|
| Ox. Perm-cc/si/d | Freely | Freely | 0.00586 | <0.0001 | 0 |
| Water Activity | 0.66 | 0.58 | 0.65 | 0.56 | 0.6–0.4 |
| Oxidation as indicated by malonaldehyde concentration (mg/kg of diet) | | | | | |
| 1 wk after production | 0.83 | 0.92 | 1.01 | 0.74 | 0 |
| After 4 mo. storage* | 5.45 | 5.06 | 1.34 | 0.91 | 0 |
| During Storage | 4.62 | 4.14 | 0.33 | 0.17 | 0 |

*at 37° C. and 85% RH which simulates the amount of oxidation that would occur in 12 months at room temperature and humidity.

EXAMPLE 2

Palatability Study

The effects of the methods used for pet food preservation on food palatability is of critical importance. Studies comparing palatability of dog food with preservatives (as described in Example 1) compared to dog food without preservatives were conducted. None of the preservatives tested effected diet palatability. Food containing no preservatives was preferred only 1.4 to 1 over the same dog food containing 0.5 Naturox, 3% lauracedin and 5% lactic acid. However, as shown in Table 9, bags had a profound effect on palatability. Table 9 contains the results of a two pan preference study conducted to determine the palatability of the same food put into different bags. The results are reported as the ratio of the mean percent that each of the two diets offered contribute to the total amount eaten by each of ten dogs at either 1 or 2 days feeding. For example, if dog 1 eats 30% diet A and 70% diet B, and dog 2 eats 10% diet A and 90% diet B, the mean is (10%+30%) divided by 2 dogs=20% diet A eaten, and 80% diet B eaten, for a preference ratio of B preferred over A by 80% to 20% or by 4 to 1. A preference ratio of less than 3 to 1 is not considered significant, i.e. indicates little or no difference in palatability between the two diets. The effect of the different types of bags on dry dog food palatability was determined in this study using both a dry extruded vegetarian dog food and a dry extruded poultry meal based dog food. Both types of dog food contained 0.5% Naturox. The atmosphere was not altered in any of the bags. As shown below, both the vegetarian dog food and the poultry meal based dog food from either of the two different types of gas impermeable bags were greatly preferred over the same diet from paper bags, whether the paper bags were poly lined or unlined. The difference occurred even though there was no difference in the amount of oxidation of the food in the gas impermeable bags from that in the paper bags.

The results in Table 9 show that, whether the dog food used was vegetarian based or poultry meal based, the dogs clearly preferred dog food contained in gas impermeable bags over that of dog food contained in paper bags (regardless of whether the paper bags were poly lined or unlined).

TABLE 9

Effects of Bags on Pet Food Palatability

| Pet Food} | in | {Gas Imperm-eable bags} | {preferred over same diet in} | {Paper Bag} | by a | {Preference Ratio of} |
|---|---|---|---|---|---|---|
| Vegetarian | | F | | poly lined | | 17 to 1 |
| Vegetarian | | K | | poly lined | | 123 to 1 |
| Poultry meal | | F | | poly lined | | 10.5 to 1 |
| Poultry meal | | F | | unlined | | 12.8 to 1 |

K = gas impermeable foil bag (Kaypac)
F = gas impermeable foil sandwiched between a layer of nylon and plastic (Fres-Co).

In light of Example 1 and Example 2, it is clear that the pet food with a high soluble fiber content and a lower water activity when contained in a gas impermeable bag demonstrates markedly increased shelf life, freshness, and palatability.

EQUIVALENTS

Those skilled in the art will recognize, or be able to ascertain using no more than routine experimentation, many equivalents to the specific embodiments of the invention described specifically herein. Such equivalents are intended to be encompassed by the scope of the following claims.

What is claimed is:

1. A substantially gas impermeable container having at least two walls capable of forming an airtight seal that forms a substantially airtight space defined by the walls devoid of oxygen scavengers nitrogen fill, or vacuum conditions, and containing within the substantially airtight space a dry pet food having a moisture level in the approximate range of 5% to 15% by weight, soluble fiber content of greater than 3% by weight, and having a water activity within the range of 0.5 to 0.8 caused substantially by the soluble fiber content.

2. The container of claim 1 wherein the walls oxygen transmission rate is about 0.6 cc/100 sq. inches/24 hours/atm or less.

3. The container of claim 1 wherein the walls oxygen transmission rate is in a range of about 0.6–0.01 cc/100 sq. inch/24 hours/atm.

4. The container of claim 1 wherein the walls are of a composition that includes a polymer, plastic, aluminum foil, metal, or polymer/metal composite.

5. The composition of claim 4 wherein the polymer is selected from the group consisting of: polyvinylidene chloride, polyester, polypropylene, nylon and polyethylene.

6. The container of claim 1 further comprising a one-way valve that allows air to escape the sealed container but not enter the sealed container.

7. The dry pet food of claim 1 wherein the water activity is 0.7 or less.

8. The dry pet food of claim 1 wherein the soluble fiber content is above 3%.

9. The dry pet food of claim 1 including ingredients selected from the group consisting of: flax seed meal, lentils, oat groats, peas, sunflower seed oil, canola seed meal, rice, dehydrated cane juice, yeast, sea kelp, calcium carbonate, salt, psyllium and spirulina.

10. The dry pet food of claim 1 further comprising about 20% crude protein, about 15% crude fat, about 8% moisture, 5% crude fiber and 5% ash.

11. In combination, a dry pet food of a moisture level in the appropriate range of 5% to 15% by weight including an amount of natural edible fiber containing material so that soluble fiber content is about 3% to about 15% by weight which causes a water activity within the range of 0.5 to 0.8, and a surrounding and sealing gas impermeable barrier package devoid of oxygen scavengers, nitrogen fill or vacuum conditions.

12. The package combination of claim 11 which uses multiple layer construction of bonded film materials.

13. The package combination of claim 11 wherein the gas impermeable barrier package is a film and foil composite.

14. The container of claim 1 wherein the soluble fiber content is in the range of 5% to 12% by weight.

15. The method of decreasing deterioration of dry dog food comprising:

decreasing water activity to 0.8 or less by including in the dry dog food natural edible soluble fiber containing materials so soluble fiber content is greater than 3% by weight;

packaging the food in a substantially gas impermeable package devoid of oxygen scavengers, nitrogen fill or vacuum conditions.

16. The method of claim 15 wherein the step of minimizing water activity comprises including a greater than 3% by weight natural edible soluble fiber in the pet food.

17. The method of claim 15 wherein the step of minimizing oxidation comprises placing the pet food in a substantially gas impermeable barrier package.

18. The method of claim 15 wherein the step of minimizing oxidation rate by controlling water activity.

19. The method of claim 15 wherein the step of minimizing oxidation comprises controlling water activity.

20. Dry pet food made by the process comprising:

creating a dry pet food having a moisture level between 5% and 15% by weight, and including a natural edible soluble fiber material so that soluble fiber content is greater than 3% by weight;

placing the food into a surrounding and sealing gas impermeable barrier package devoid of oxygen scavengers, nitrogen filler, and vacuum conditions, so that water activity is 0.8 or less caused substantially by the natural edible soluble fiber material and oxidation is minimized because of the binding of water to the soluble fiber material and limitation on entry of oxygen into the package.

* * * * *